United States Patent
Kryj-Kos et al.

(10) Patent No.: US 12,304,614 B2
(45) Date of Patent: May 20, 2025

(54) COMPOSITE AIRFOIL ASSEMBLY AND METHOD OF FORMING A COMPOSITE AIRFOIL ASSEMBLY

(71) Applicant: GENERAL ELECTRIC COMPANY, Schenectady, NY (US)

(72) Inventors: Elzbieta Kryj-Kos, Liberty Township, OH (US); Nicholas Joseph Kray, Mason, OH (US); Tod Winton Davis, Cincinnati, OH (US); Gary Willard Bryant, Jr., Loveland, OH (US)

(73) Assignee: General Electric Company, Evendale, OH (US)

( * ) Notice: Subject to any disclaimer, the term of this patent is extended or adjusted under 35 U.S.C. 154(b) by 32 days.

(21) Appl. No.: 18/333,743

(22) Filed: Jun. 13, 2023

(65) Prior Publication Data
US 2024/0417063 A1    Dec. 19, 2024

(51) Int. Cl.
  *F01D 5/28*  (2006.01)
  *B64C 11/26*  (2006.01)
(52) U.S. Cl.
  CPC .............. *B64C 11/26* (2013.01); *F01D 5/282* (2013.01); *F05D 2230/23* (2013.01)
(58) Field of Classification Search
  CPC ....................................................... F01D 5/282
  See application file for complete search history.

(56) References Cited

U.S. PATENT DOCUMENTS

| | | | |
|---|---|---|---|
| 6,361,878 B2 | 3/2002 | Ritter et al. | |
| 8,017,188 B2 | 9/2011 | Xie et al. | |
| 8,105,042 B2 | 1/2012 | Parkin et al. | |
| 8,419,374 B2 | 4/2013 | Huth et al. | |
| 8,573,947 B2 | 11/2013 | Klinetob et al. | |
| 8,696,319 B2 | 4/2014 | Naik | |
| 8,974,656 B2 * | 3/2015 | Trimmer ................ | B23H 9/008 205/658 |
| 9,956,653 B2 | 5/2018 | Wilson et al. | |
| 10,487,671 B2 * | 11/2019 | Klein ........................ | B21K 3/04 |
| 10,794,193 B2 | 10/2020 | Kupratis et al. | |
| 2012/0141671 A1 | 6/2012 | Fairbourn | |
| 2020/0191001 A1 * | 6/2020 | Okabe ..................... | F01D 5/282 |

FOREIGN PATENT DOCUMENTS

| | | |
|---|---|---|
| DE | 19847222 A1 | 4/2000 |
| FR | 2638156 A1 | 4/1990 |
| GB | 631362 | 11/1949 |

* cited by examiner

*Primary Examiner* — Michael L Sehn
(74) *Attorney, Agent, or Firm* — McGarry Bair PC

(57) ABSTRACT

A composite airfoil assembly for a gas turbine engine. The composite airfoil assembly includes a composite airfoil defined by a core and a skin. The composite airfoil assembly further includes cladding. The core defines a core exterior, where the skin is applied to at least a portion of the core exterior. The cladding is prepared before being coupled or adhered to the composite airfoil.

20 Claims, 7 Drawing Sheets

COMPOSITE AIRFOIL ASSEMBLY AND METHOD OF FORMING A COMPOSITE AIRFOIL ASSEMBLY

TECHNICAL FIELD

The disclosure generally relates to a turbine engine and, more specifically, to a composite airfoil assembly for a turbine engine.

BACKGROUND

A turbine engine typically includes an engine core with a compressor section, a combustor section, and a turbine section in serial flow arrangement. A fan section can be provided upstream of the compressor section in a turbofan or bypass configuration. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

With the advent of composite materials, composites have been used to make components of the gas turbine engine. Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
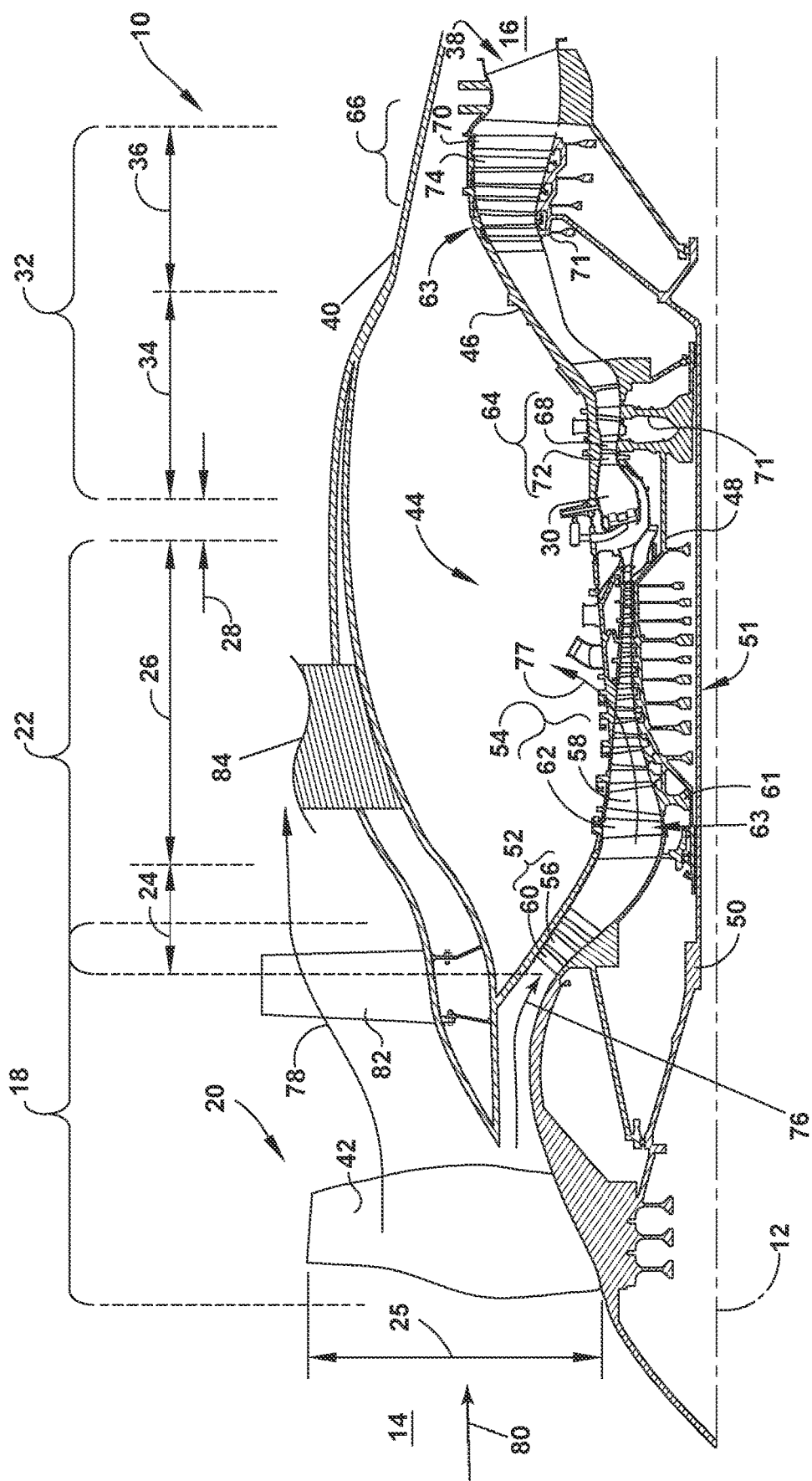
FIG. 1 is a schematic cross-sectional view of an unducted or open rotor turbine engine.

Aspects of the disclosure herein are directed to a composite component to be used to create an engine component for a turbine engine. The composite component is illustrated as a composite airfoil assembly having a composite airfoil with cladding. The composite airfoil includes at least a core and skin illustrated as a woven core and laminate skin, where the skin is applied to at least a portion of an exterior surface of the core. The cladding includes at least two pieces, where at least one of the two pieces are coupled (e.g., adhered) to the composite airfoil adjacent a tip or a trailing edge of the composite airfoil. The cladding includes a cladding exterior surface and a cladding interior surface. The cladding interior surface is coupled to a skin outer surface. Prior to coupling the cladding interior surface to the skin outer surface, the cladding interior surface is prepared or otherwise roughened to have an arithmetic average roughness (Ra) of at least 100. The cladding interior surface, having an Ra of at least 100, more specifically having an Ra between 150 and 400, can improve the connection between the cladding and the skin. The preparation of the interior surface of each cladding results in a topography having a minimum of ten random peaks per 645 square millimeters (approximately 1 square inch). The random peaks, when measured from a base to a peak, can have a height in a range from 0.007 millimeters to 0.025 millimeters (approximately 0.0003 inches and 0.0010 inches).

Extreme loading or sudden forces can be applied to the composite components of an aircraft or turbine engine. For example, extreme loading can occur to one or more airfoils during ingestion of various materials by the turbine engine. The cladding, having improved connectivity between the cladding interior surface and the outer surface of the skin can reduce deflection of the composite airfoil assembly. Further, the improved connectivity between the cladding interior surface and the outer surface of the skin can reduce separation of the cladding from the skin during an extreme loading event or application of sudden forces to the composite airfoil assembly.

It should be understood, that the disclosure applies to other engine components of the turbine engine, not just an airfoil, such as a disk or combustor liner, in non-limiting examples. Further, while described in terms of a core used in the manufacture of an airfoil, it will be appreciated that the present disclosure is applied to any other suitable environment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", or "fourth" may be used interchangeably to distinguish one component from another and are not intended to signify location or importance of the individual components.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, ducted turbine engines, unducted turbine engines, etc., as well as hybrid-electric versions of one or more of these engines.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

The term "fluid" may be a gas or a liquid, or multi-phase.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. For example, in the overall context of a turbine engine, radial refers to a direction along a ray extending between a center longitudinal axis of the engine and an outer engine circumference. In addition, as used herein, the terms "circumferential" and "circumferentially" refer to directions and orientations that extend arcuately about the centerline of the gas turbine engine.

The terms "coupled," "fixed," "applied to," "attached to" and the like refer to both direct coupling, fixing, or attaching, as well as indirect coupling, fixing, or attaching through one or more intermediate components or features, unless otherwise specified herein.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise.

Furthermore, as used herein, the term "set" or a "set" of elements can be any number of elements, including only one.

As used herein, the term "stiffness" may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

As used herein, the term "elasticity" may be used as defining the modulus of elasticity (Young's modulus) under tension or compression, and may relate to an elasticity for a particular material or structure made of such material, such as the engine components described herein. The elasticity can represent the stress per unit area relative to the local strain or proportional deformation thereof.

As used herein, the term "arithmetic average roughness (Ra)," is the absolute average relative to the base length. That is, the Ra value indicates the average surface roughness for the length of the measurement performed, for example, the average difference between peaks and valleys. Ra can be defined as the average variation of the roughness profile from the mean line.

By way of non-limiting example, the Ra can be determined directly, for example, by using a skid or non-skid roughness measuring tool. Additionally, or alternatively, Ra can be determined optically, for example, by using an interferometer. Additionally, or alternatively Ra can be determined indirectly using one or more impressions combined with a direct or indirect measurement.

Ra can be calculated using:

$$Ra = \frac{1}{L}\int_0^L |Z(x)|dx; \qquad (1)$$

where L is the length of the area to be examined, Z(x) is the profile height function or roughness profile, and dx is the differential. The term x can be the profile height.

The term "composite," as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, polymeric resins, thermoplastics, bismaleimide (BMI) materials, polyimide materials, epoxy resins, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more intervening layers or layers of adhesive can be used in forming or coupling composite components. Adhesives can include resin and phenolics, wherein the adhesive can require curing at elevated temperatures or other hardening techniques. By way of non-limiting example, if an interior of a first object is coupled to an exterior of a second object, one or more intervening layers or layers of adhesive can be present between the interior of a first object and the exterior of a second object.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic components (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC-SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers can be impregnated with a slurry composition prior to forming the preform or after formation of the preform. The preform may then undergo thermal processing and subsequent chemical processing, such as melt-infiltration with silicon, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

The reinforcing fibers can be at least portions of individual filaments or strands. As used herein, a "ceramic fiber tow," a "fiber tow," or simply a "tow" refers to a bundle of a plurality of individual fibers, filaments, or loose strands. The filaments of a tow may be randomly intermingled or arranged in a pattern, and/or may be continuous or non-continuous. For example, a tow may include broken filaments or filament segments. As another example, the filaments of a tow may be substantially parallel, twisted, or otherwise arranged. A tow may act substantially in the same manner as a single or individual filament. It will also be appreciated that an "individual ceramic filament," or simply an "individual filament," as used herein, refers to a singular or non-bundled elongate ceramic member.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbine blades, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, brass, copper, and nickel alloys. A metallic material or alloy can be a combination of at least two or more elements or materials, where at least one is a metal.

The term "metallic" as used herein is indicative of a material that includes metal such as, but not limited to, titanium, iron, aluminum, stainless steel, brass, copper, and nickel alloys. A metallic material or alloy can be a combination of at least two or more elements or materials, where at least one is a metal. As used herein, the term "additive manufacturing" generally refers to manufacturing processes wherein a feedstock of material in a particulate powder or wire form aggregates to form a three-dimensional component. The feedstock material is then fused through the application of heat or other curing processes to form a monolithic unitary component, which can have a variety of integral sub-components. Monolithic, as used herein, refers to a unitary structure lacking interfaces or joints by virtue of the materials of each layer fusing to or melting with the materials of adjacent layers such that the individual layers lose their identity in the final unitary structure.

Suitable additive manufacturing techniques in accordance with the present disclosure include, for example, directed energy deposition (DED), fused deposition modeling (FDM), selective laser sintering (SLS), 3D printing such as by inkjets and laserjets, sterolithography (SLA), direct selective laser sintering (DSLS), electron beam sintering (EBS), electron beam melting (EBM), laser engineered net shaping (LENS), laser net shape manufacturing (LNSM), direct metal deposition (DMD), digital light processing (DLP), direct selective laser melting (DSLM), selective laser melting (SLM), direct metal laser melting (DMLM), and other known processes.

The digital light processing (DLP) can include a 3D DLP printer having a transparent vat or transparent tank, a building platform, and a light assembly. The transparent vat or transparent tank can contain, for example, a photopolymer resin.

The DLP building platform can couple to, for example, a motor or other mechanisms permitting the movement of the building platform in one or more dimensions, such as raising or lowering the building platform from or toward the resin in the vat or tank.

A DLP printed component can couple to a lower portion of the building platform facing the vat or tank. The lighting assembly is located, at least in part, below the vat or tank. The lighting assembly can include at least one light source and at least one optical reflector or refractor such as, for example, a deflection mirror or at least one lens.

A controller coupled to or included in the DLP printer can control one or more aspects of the DLP printer such as, for example, the position of the DLP building platform or the intensity, duration, or orientation of the lighting source.

In addition to using a direct metal laser sintering (DMLS), a direct metal laser melting (DMLM) process, or an electron beam melting (EBM) process, where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

FIG. 1 is a schematic cross-sectional diagram of a gas turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The unducted turbine engine 10 as described herein is meant as a non-limiting example, and other turbine engine architectures are possible, such as, but not limited to, a steam turbine engine, a supercritical carbon dioxide turbine engine, or any other suitable turbine engine. These other turbine engine architectures can be ducted or unducted and can have a fan section or not.

An exterior surface, defined by a housing, such as a nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or the set of stationary fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft or spool 48 disposed coaxially about the engine centerline 12 of the unducted turbine engine 10 drivingly connects the HP turbine 34 to the HP compressor 26. An LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are be mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor refers to the combination of rotating elements throughout the unducted turbine engine 10.

Complementary to the rotor portion, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

During operation of the unducted turbine engine 10, a freestream airflow 80 flows against a forward portion of the unducted turbine engine 10. A portion of the freestream airflow 80 enters an annular area 25 defined by the swept area between the outer surface of the nacelle 40 and the tip of the blade, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42 and over the nacelle 40 of the unducted turbine engine 10. Subsequently, the inlet airflow 78 flows over at least a portion of the set of stationary fan vanes 82, which directs the inlet airflow 78 such that it is transverse toward the engine centerline 12. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
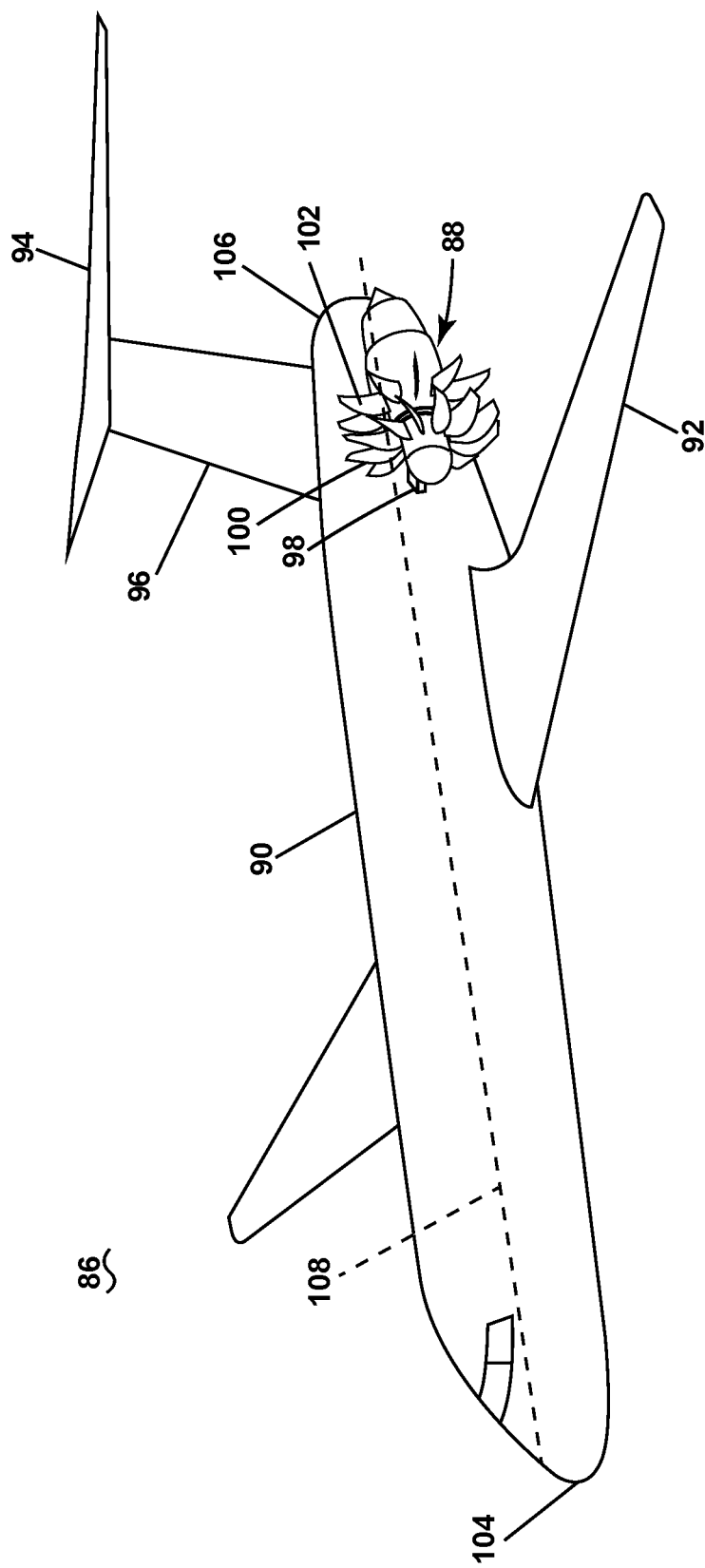
FIG. 2 is a schematic perspective view of an aircraft including the unducted or open rotor turbine engine of FIG. 1.

FIG. 2 is a schematic perspective view of an aircraft 86 including a generic unducted turbine engine 88 suitable for use as the unducted turbine engine 10 of FIG. 1. The aircraft 86 includes a fuselage 90 with an exterior surface. At least one wing 92 and a tail wing 94 extend from the fuselage 90. The tail wing 94 is operably coupled to and spaced from the fuselage 90 via a tail wing pylon 96. The unducted turbine engine 88 is operably coupled to the exterior surface of the fuselage 90 via a pylon 98. The unducted turbine engine 88 includes a set of circumferentially spaced fan blades 100. A set of stationary fan vanes 102 is provided downstream of the set of circumferentially spaced fan blades 100. The fuselage 90 extends between a nose 104 and a tail 106 and includes a fuselage centerline 108 extending therebetween.

Additionally, while the tail wing 94 is a T-wing tail wing (e.g., the tail wing 94 as illustrated), other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 94.

Figure 3:
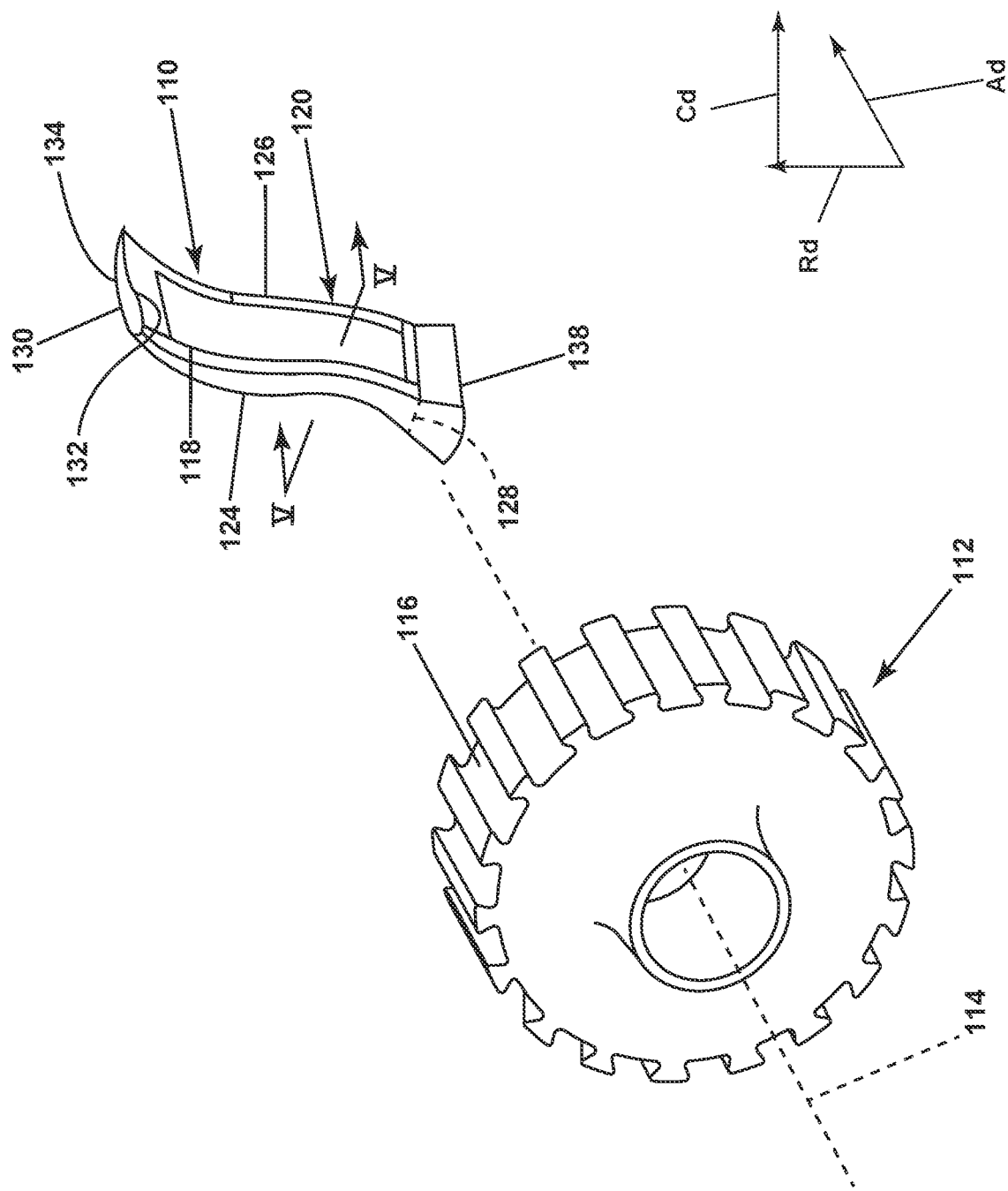
FIG. 3 is a schematic perspective view of a composite airfoil assembly and a disk assembly suitable for use within the turbine engine of FIG. 1 and FIG. 2, the composite blade assembly including a composite airfoil, cladding, and a dovetail, in accordance with an exemplary embodiment of the present disclosure.

FIG. 3 is a schematic perspective view of a composite airfoil assembly 110 and a disk assembly 112 suitable for use within the unducted turbine engine 10 of FIG. 1 or the unducted turbine engine 88 of FIG. 2. The disk assembly 112 is suitable for use as the disk 61, 71 (FIG. 1) or any other disk such as, but not limited to, a disk within the fan section 18, the compressor section 22, or the turbine section 32 of the unducted turbine engine 10. The composite airfoil assembly 110 can be rotating or non-rotating such that the composite airfoil assembly 110 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil assembly 110 can be a composite fan blade assembly.

The disk assembly 112 can be rotatable or stationary about a rotational axis 114. The rotational axis 114 can coincide with or be offset from the engine centerline (e.g., the engine centerline 12 of FIG. 1). The disk assembly 112 includes a plurality of slots 116 extending axially through a radially outer portion of the disk assembly 112 and being circumferentially spaced about the disk assembly 112, with respect to the rotational axis 114.

The composite airfoil assembly 110 includes a composite airfoil 118 and cladding 120. The composite airfoil 118 extends between a leading edge 124 and a trailing edge 126, opposite the leading edge 124, to define a chord-wise direction. The composite airfoil 118 extends between a root 128 and a tip 130 to define a span-wise direction. The composite airfoil 118 includes a pressure side 132 and a suction side 134, opposite the pressure side 132.

The leading edge 124 and the trailing edge 126, extend radially from the root 128 to the tip 130. The pressure side 132 and the suction side 134, opposite the pressure side 132, extend axially between the leading edge 124 and trailing edge 126. A dovetail portion 138 can extend from the composite airfoil 118.

The composite airfoil assembly 110 is coupled to the disk assembly 112 by inserting at least a portion of the dovetail portion 138 into a respective slot of the plurality of slots 116. The composite airfoil assembly 110 is held in place by frictional contact with the slot 116 or can be coupled to the slot 116 via any suitable coupling method such as, but not limited to, welding, adhesion, fastening, or the like. While only a single composite airfoil assembly 110 is illustrated, it will be appreciated that there can be any number of composite airfoils assemblies 110 coupled to the disk assembly 112. As a non-limiting example, there can be a plurality of composite airfoil assemblies 110 corresponding to a total number of slots of the plurality of slots 116.

For the sake of reference, a set of relative reference directions, along with a coordinate system can be applied to the composite airfoil assembly 110. An axial direction (Ad), can extend from forward to aft and is shown extending at least partially into the page. The axial direction (Ad) and can be arranged parallel to the rotational axis 114. A radial direction (Rd) extends perpendicular to the axial direction (Ad), and can extend perpendicular to the engine centerline 12. A circumferential direction (Cd) can be defined perpendicular to the radial direction (Rd), and can be defined along the circumference of the unducted turbine engine 10 (FIG. 1) relative to the engine centerline 12 (FIG. 1).

Figure 4:
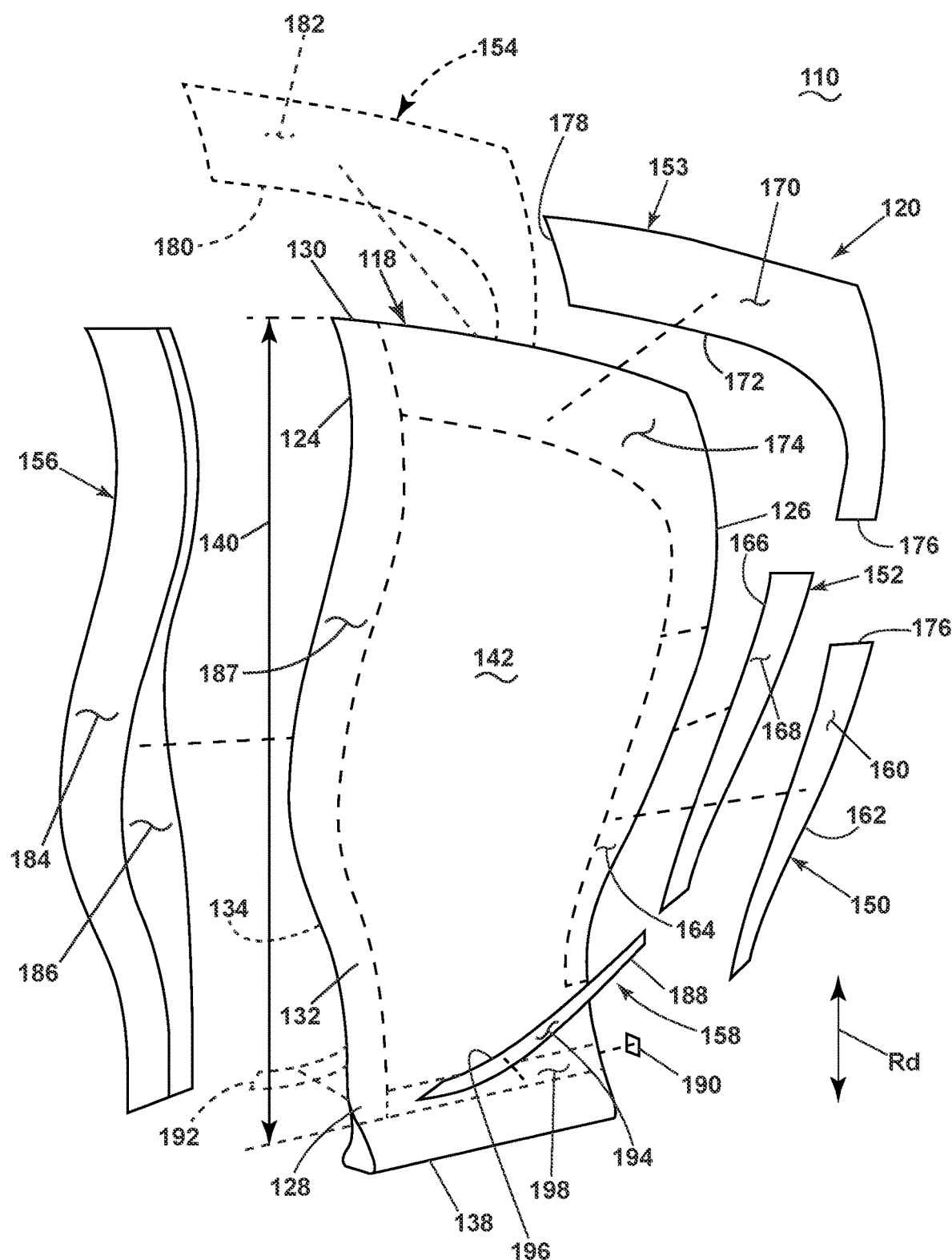
FIG. 4 is a partially exploded view of the composite airfoil assembly of FIG. 3, in accordance with an exemplary embodiment of the present disclosure.

FIG. 4 is a partially exploded view of the composite airfoil assembly 110, where the cladding 120 is exploded from the composite airfoil 118. An airfoil length 140 can be measured from the root 128 to the tip 130 of the composite airfoil 118. While illustrated as variable, the airfoil length 140 can be an average length, minimum length, or maximum length measured from the root 128 to the tip 130 of the composite airfoil 118 in the radial direction (Rd).

The cladding 120 couples to at least a portion of an outer surface of the composite airfoil 118. By way of illustrative example, the cladding 120 includes a first cladding 150, a second cladding 152, and a third cladding 153. Optionally, the cladding 120 can include any one or more of a fourth cladding 154, a leading-edge sheath 156, or a root cladding 158. While illustrated as formed separately, any one or more of the first cladding 150, the second cladding 152, the third cladding 153, the fourth cladding 154, the leading-edge sheath 156, or the root cladding 158 can be unitarily formed or combined.

The cladding 120 can overlie or cover 0.6% to 70% of the total outer surface area of the composite airfoil 118. More specifically, the cladding 120 can cover a range from 2% to 60% of a total outer surface area of the composite airfoil 118, where the total outer surface area defined as a sum of the pressure side surface area and the suction side surface area of the composite airfoil 118. Still more specifically, the cladding 120 can cover a range from 5% to 30% of the total outer surface area of the composite airfoil 118. The range of values for the cladding 120 maintain the weight benefit of the composite airfoil 118 and improved stiffness provided by the cladding 120.

The first cladding 150 is illustrated, by way of example, as located adjacent the trailing edge 126 of the composite airfoil 118 when mounted, bonded, or otherwise coupled to a skin outer surface 142. As used herein, "adjacent the trailing edge 126" means that the greatest distance measured from the trailing edge 126 to any portion of the adjacent object is less than 30% of the airfoil length 140. Further, the first cladding 150 is illustrated, by way of example, as located at the trailing edge 126 of the composite airfoil 118. That is, at least a portion of the first cladding 150 is in contact with the trailing edge 126 when the first cladding 150 is mounted, bonded, or otherwise coupled to the composite airfoil 118.

While illustrated as mounted to the pressure side 132 of the composite airfoil 118, it is contemplated that the first cladding 150 can be mounted to the suction side 134 adjacent the trailing edge 126 or adjacent the tip 130. As used herein, "adjacent the tip 130" means that the greatest distanced measure from the tip 130 to any portion of the adjacent object is less than 30% of the airfoil length 140.

While illustrated as generally rectangular, the first cladding 150 can have a shape that is any combination of one or more regular polygons, irregular polygons, or circles.

The first cladding 150 includes a first cladding exterior surface 160 and a first cladding interior surface 162. The first cladding interior surface 162 can have an Ra greater than 100. More specifically, the first cladding interior surface 162 can have an Ra in a range from 150 to 400. Yet still more specifically, the first cladding interior surface 162 can have an Ra in a range from 150 to 300. When coupled to the composite airfoil 118, the first cladding interior surface 162 of the first cladding 150 is coupled to a portion of the skin outer surface 142 of the composite airfoil 118.

A first coverage area 164, illustrated as bounded by dotted lines, is defined as the amount of area of the skin outer surface 142 of the composite airfoil 118 that is covered by the first cladding 150 when the first cladding interior surface 162 is adhered, bonded, or otherwise coupled to the skin outer surface 142. That is, the first coverage area 164 is the portion of the skin outer surface 142 that couples to the first cladding interior surface 162. The first coverage area 164 can be in a range from 0.3% to 70% of a total outer surface area of the composite airfoil 118. More specifically, the first coverage area 164 can be in a range from 1% to 20% of a total outer surface area of the composite airfoil 118. The range of values for first coverage area 164 by the first cladding 150 maintains the weight benefit of the composite airfoil 118 and improved stiffness provided by the first cladding 150.

The second cladding 152 is illustrated, by way of example, as located adjacent the trailing edge 126 of the composite airfoil 118 when mounted, bonded, or otherwise coupled to the skin outer surface 142 of the composite airfoil 118. Further, the second cladding 152 is illustrated, by way of example, as located at the trailing edge 126 of the composite airfoil 118.

While illustrated as generally rectangular, the second cladding 152 can have a shape that is any combination of one or more regular polygons, irregular polygons, or circles.

Similar to the first cladding 150, the second cladding 152 includes a second cladding exterior surface 166 and a second cladding interior surface 168. The second cladding interior surface 168 can have an Ra greater than 100. More specifically, the second cladding interior surface 168 can have an Ra in a range from 150 to 400. Yet more specifically, the second cladding interior surface 168 can have an Ra in a range from 150 to 300.

Figure 5:
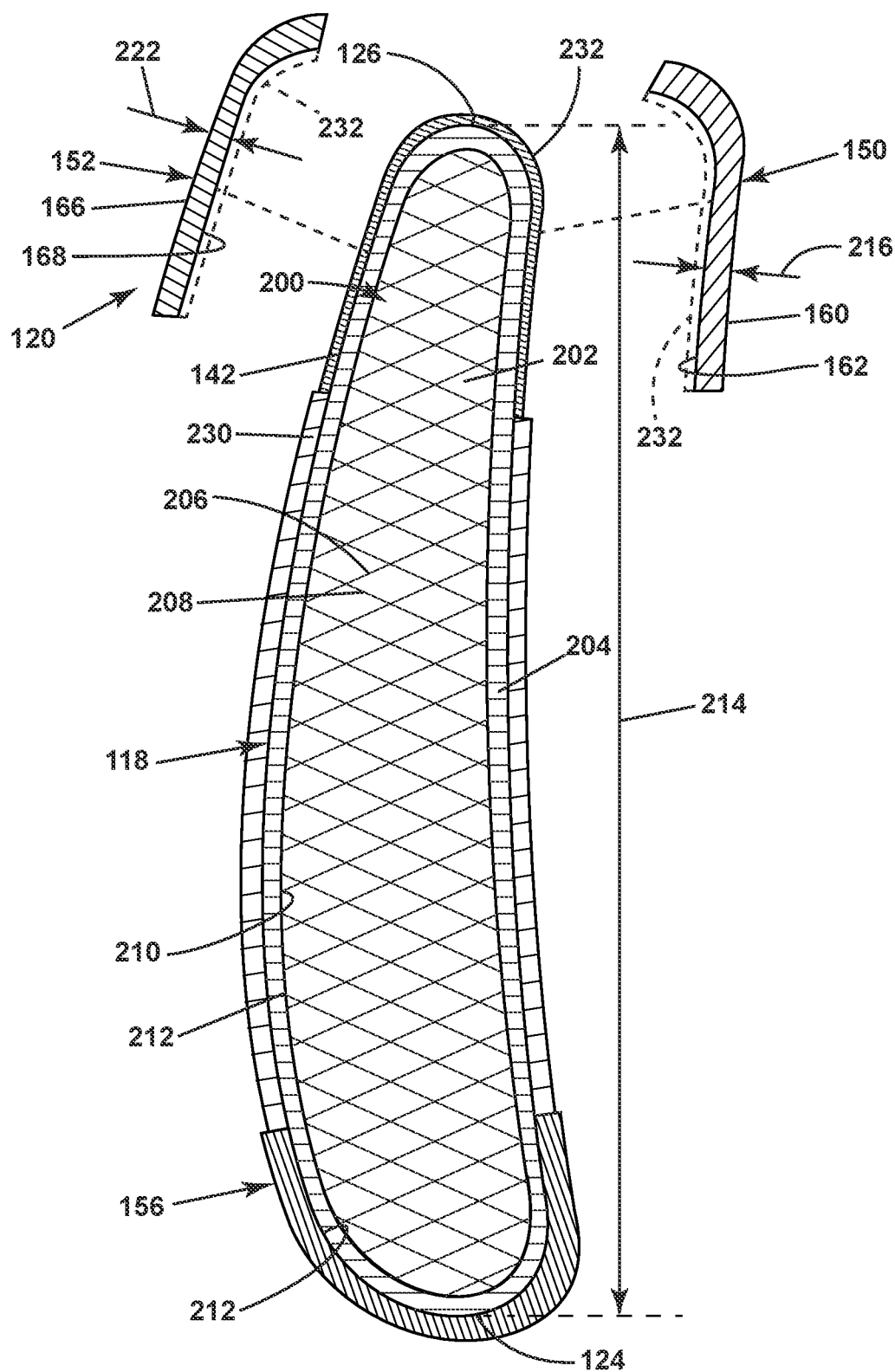
FIG. 5 is a schematic cross-sectional view taken along line V-V of FIG. 3 showing an interior of the composite airfoil and a subset of cladding applied to the composite airfoil, in accordance with an exemplary embodiment of the present disclosure.

It is contemplated that the Ra of the second cladding interior surface 168 can be within 5% of the Ra value of the first cladding interior surface 162. Alternatively in another different and non-limiting example, it is contemplated that the Ra of the second cladding interior surface 168 can be different than of the Ra value of the first cladding interior surface 162. That is, while falling within the same range, the Ra of the second cladding interior surface 168 can be different than of the Ra value of the first cladding interior surface 162. It is yet further contemplated that the percent difference between the Ra of the second cladding interior surface 168 and the Ra value of the first cladding interior surface 162 can be greater than 5%. The difference in Ra values of the second cladding interior surface 168 and the Ra value of the first cladding interior surface 162 can result from one or more of the second cladding 152 and the first cladding 150 being manufactured by different materials, the second cladding 152 and the first cladding 150 being manufactured using the same materials but different proportions of those materials, or the second cladding 152 and the first cladding 150 having different thicknesses 216, 222 (FIG. 5).

When coupled to the composite airfoil 118, the second cladding interior surface 168 of the second cladding 152 is coupled to a portion of the skin outer surface 142. A second coverage area (not shown), is defined as the amount of area of the skin outer surface 142 of the composite airfoil 118 covered by the second cladding 152 when the second cladding 152 is bonded or otherwise coupled to the skin outer surface 142 on the suction side 134 of the composite airfoil 118. The second coverage area can be in a range from 0.3% to 70% of the total surface area of the composite airfoil 118. More specifically, the second coverage area can be in a range from 1% to 20% of a total outer surface area of the composite airfoil 118. The range of values for second coverage area by the second cladding 152 maintain the weight benefit of the composite airfoil 118 and improved stiffness provided by the second cladding 152.

The second coverage area of the second cladding 152 can have a similar shape, mirrored shape, or an area similar to the first coverage area 164 of the first cladding 150. That is, the area of the first coverage area 164 can be equal to or within 20% of the area of the second coverage area.

It is contemplated that, when coupled to the skin outer surface 142 of the composite airfoil 118, at least a portion of the first cladding 150 and the second cladding 152 can be in contact. That is, the first cladding 150 and the second cladding 152 can have, for example, edges that would make contact when mounted to the composite airfoil 118.

Alternatively, in a different and non-limiting example, the first cladding 150 and the second cladding 152 can be unitarily formed, having a V-shaped or U-shaped cross-section. That is, the first cladding 150 can have parts on both the suction side 134 and the pressure side 132, such that a portion of the unitarily formed first and second cladding 150, 152 covers a portion of the trailing edge 126. In other words, the first cladding 150 or the second cladding 152 can define a cladding that wraps around the trailing edge 126 of the composite airfoil 118 where a portion of the cladding is on the pressure side 132 and another portion extends to the suction side 134. It is further contemplated that the third cladding 153 can wrap around the top, having portions on both the suction side 134 and the pressure side 132.

The third cladding 153 is illustrated, by way of example, as located adjacent the tip 130 of the composite airfoil 118 when mounted, bonded, or otherwise coupled to the skin outer surface 142 of the composite airfoil 118. Further, the third cladding 153 is illustrated, by way of example, as located at the tip 130 of the composite airfoil 118. That is, at least a portion of the third cladding 153 is in contact with the tip 130 when the third cladding 153 is mounted, bonded, or otherwise coupled to the composite airfoil 118.

While illustrated as having a generally L-shaped body, the third cladding 153 can have a shape that is any combination of one or more polygons, irregular polygons, or circles.

The third cladding 153 includes a third cladding exterior surface 170 and a third cladding interior surface 172. The third cladding interior surface 172 can have an Ra of greater than 100. More specifically, the third cladding interior surface 172 can have an Ra in a range from 150 to 400. Yet more specifically, the third cladding interior surface 172 can have an Ra in a range from 150 to 300.

It is contemplated that the Ra of the third cladding exterior surface 170 can be within 5% of the Ra value of the first cladding interior surface 162 or the second cladding interior surface 168. Alternatively in another different and non-limiting example, it is contemplated that the Ra of the third cladding exterior surface 170 can be different than of the Ra value of the first cladding interior surface 162 and the second cladding interior surface 168. That is, while falling within the same range, the Ra of the third cladding interior surface 170 can be different than of the Ra value of the first cladding interior surface 162 or the second cladding interior surface 168. It is yet further contemplated that the percent difference between the Ra of the third cladding interior surface 170 and the Ra value of the first cladding interior surface 162 or the second cladding interior surface 168 can be greater than 5%. The difference in Ra values of the third cladding interior surface 170 and the Ra value of the first cladding interior surface 162 or the second cladding interior surface 168 can result from one or more of the third cladding 153 and the first or second claddings 150, 152 being manufactured by different materials, the third cladding 153 and the first or second claddings 150, 152 being manufactured using the same materials but different proportions of those materials, or the third cladding 153 and the first or second cladding 150, 152 having different thicknesses.

When coupled to the composite airfoil 118, the third cladding interior surface 172 of the third cladding 153 is coupled to a portion of the skin outer surface 142 of the composite airfoil 118. A third coverage area 174, illustrated by dotted lines, can be defined as the surface area covered by the third cladding 153, when the third cladding 153 is coupled to the pressure side 132 of the composite airfoil 118. The third coverage area 174 can be in a range from 0.3% to 70% of the total surface area of the composite airfoil 118. More specifically, the third coverage area 174 can be in a range from 2% to 20% of a total outer surface area of the composite airfoil 118. The range of values for the third coverage area 174 provide a balance between the weight benefit of the composite airfoil 118 and the added stiffness or strength from the third cladding 153.

It is contemplated that when coupled to the skin outer surface 142 of the composite airfoil 118, at least a portion, illustrated as edge portions 176, of the first cladding 150 and the third cladding 153 can be in contact. Additionally, or alternatively, a leading portion 178 of the third cladding 153 can be in contact with one or more portions of the leading-edge sheath 156.

Optionally, the cladding 120 can include a fourth cladding 154. The fourth cladding 154 can be coupled to the opposite side of the composite airfoil 118 as the third cladding 153. As illustrated the fourth cladding 154 can be coupled to the suction side 134. It is contemplated that the fourth cladding 154 can have a surface area that has a similar geometry as the third cladding 153. That is, a surface area of the fourth cladding 154 can be within 10% of the third cladding 153. Alternatively, in another non-limiting example, it is contemplated that the surface area of the fourth cladding 154 can have a percent difference greater than 10% when compared to the third cladding 153.

The fourth cladding 154 includes a fourth cladding exterior surface 180 and a fourth cladding interior surface 182. The fourth cladding interior surface 182 can have an Ra of greater than 100. More specifically, the fourth cladding interior surface 182 can have an Ra in a range from 150 to 400. Yet more specifically, the fourth cladding interior surface 182 can have an Ra in a range from 150 to 300.

It is contemplated that the Ra of the fourth cladding exterior surface 180 can be within 5% of the Ra value of one or more of the first cladding interior surface 162, the second cladding interior surface 168, or the third cladding exterior surface 170. Alternatively, in another different and non-limiting example, it is contemplated that the Ra of the fourth cladding exterior surface 180 can be different than of the Ra value of the first cladding interior surface 162, the second cladding interior surface 168, and the third cladding exterior surface 170. That is, while falling within the same range, the Ra of the fourth cladding interior surface 180 can be different than of the Ra value of the first cladding interior surface 162, the second cladding interior surface 168, or the third cladding exterior surface 170. It is yet further contemplated that the percent difference between the Ra of the fourth cladding interior surface 180 and the Ra value of one or more of the first cladding interior surface 162, the second cladding interior surface 168, or the third cladding exterior surface 170 can be greater than 5%. The difference in Ra values of the fourth cladding interior surface 180 and the Ra value of one or more of the first cladding interior surface 162, the second cladding interior surface 168, or the third cladding exterior surface 170 can result from one or more of the fourth cladding 154 and the first, second, or third claddings 150, 152, 153 being manufactured by different materials, the fourth cladding 154 and the first, second, or third claddings 150, 152, 153 being manufactured using the same materials but different proportions of those materials, or the fourth cladding 154 and first, second, or third claddings 150, 152, 153 having different thicknesses.

Alternatively, in a different and non-limiting example, the third cladding 153 and the fourth cladding 154 can be unitarily formed, having a V-shaped or U-shaped cross-section. That is, the third cladding 153 can have parts on both the suction side 134 and the pressure side 132, such that a portion of the unitarily formed third and fourth cladding 153, 154 covers a portion of the tip 130. In other words, the third cladding 153 or the third cladding 153 and the fourth cladding 154 can define a cladding that wraps around the tip 130 of the composite airfoil 118 where a portion of the cladding is on the pressure side 132 and another portion extends to the suction side 134.

The leading-edge sheath can wrap around the leading edge 124. That is, the leading-edge sheath 156 can have a V-shaped or U-shaped cross-section.

The leading-edge sheath 156 includes a sheath exterior surface 184 and a sheath interior surface 186. The sheath interior surface 186 can have an Ra of greater than 100. More specifically, the sheath interior surface 186 can have an Ra in a range from 150 to 400. Yet more specifically, the sheath interior surface 186 can have an Ra in a range from 150 to 300.

The leading-edge sheath 156 can be mounted, bonded, or otherwise coupled to the composite airfoil 118 at the leading edge 124. A sheath coverage area 187 of the leading-edge sheath 156 can have a greater surface area than the first coverage area 164, the second coverage area, or the third coverage area 174.

The root cladding 158 can include a pressure side root portion 188, a trailing edge root portion 190, and a suction side root portion 192. Each portion of the root cladding 158 can have a root exterior surface 194 and a root interior surface 196, where one or more portions of the root interior surface 196 have an Ra greater than 100. More specifically, the one or more portions of the root interior surface 196 can have an Ra in a range from 150 to 400. Yet more specifically, the one or more portions of the root interior surface 196 can have an Ra in a range from 150 to 300.

The root cladding 158 can be mounted, bonded, or otherwise coupled to the composite airfoil 118 adjacent the dovetail portion 138 or at the root 128 of the composite airfoil 118. As used herein, "adjacent the dovetail portion 138" means that the greatest distance measured from the dovetail portion 138 to any portion of the adjacent object is less than 30% of the airfoil length 140.

A root coverage area 198 of the root cladding 158 can have a surface area that is less than the first coverage area 164, the second coverage area, the third coverage area 174, or the sheath coverage area 187. Alternatively, in another non-limiting example, the root coverage area 198 can be equal to or greater than the first coverage area 164, the second coverage area, the third coverage area 174, or the sheath coverage area 187.

It is contemplated that the Ra of the sheath interior surface 186 or the root interior surface 196 can be within 5% of the Ra value of one or more of the first, second, third, or fourth cladding interior surfaces 162, 168, 170, 180. Alternatively, in another different and non-limiting example, it is contemplated that the Ra of the sheath interior surface 186 or the root interior surface 196 can be different than of the Ra value of one or more of the first, second, third, or fourth cladding interior surfaces 162, 168, 170, 180. That is, while falling within the same range, the Ra of the sheath interior surface 186 or the root interior surface 196 can be different than of the Ra value of the Ra value of one or more of the first, second, third, or fourth cladding interior surfaces 162, 168, 170, 180.

It is yet further contemplated that the percent difference between the Ra of the sheath interior surface 186 or the root interior surface 196 and the Ra value of one or more of the first, second, third, or fourth cladding interior surfaces 162, 168, 170, 180 can be greater than 5%. The difference in Ra values of the sheath interior surface 186 or the root interior surface 196 and the Ra value of one or more of the first, second, third, or fourth cladding interior surfaces 162, 168, 170, 180 can result from one or more of the being manufactured by different materials, being manufactured using the same materials but different proportions of those materials, or having different cladding thicknesses.

It is contemplated that adhesive 232 (FIG. 5) or mechanical fasteners can be used to couple the cladding 120 to the skin outer surface 142 of the composite airfoil 118. By way of non-limiting example, adhesives used to couple the first cladding 150, the second cladding 152, the third cladding 153, the fourth cladding 154, the leading-edge sheath 156, or the root cladding 158 to the skin outer surface 142 of the composite airfoil 118 can include epoxy, phenolic, adhesive film, adhesive tape, cyanoacrylate, anaerobic adhesive, thermoplastic adhesive, polymeric resin, or other thermoset adhesive.

The first cladding 150, the second cladding 152, the third cladding 153, or the fourth cladding 154 can be formed from one or more of a metallic material, thermoplastic material, or composite material, having a second bulk modulus. As used herein, "bulk modulus" refers to a numerical constant that describes the elastic properties of a solid or fluid when it is under pressure on all surfaces. The first cladding 150, second cladding 152, the third cladding 153, and the fourth cladding 154 can be made of similar materials. That is, a first bulk modulus of the first cladding 150 can be equal to or within 10% of a second bulk modulus of the second cladding 152, a third bulk modulus of a third cladding 153, or the fourth bulk modulus of the fourth cladding 154. Additionally, or alternatively, the second bulk modulus of the second cladding 152 can be equal to or within 10% of the third bulk modulus of a third cladding 153 or the fourth bulk modulus of the fourth cladding 154. Additionally, or alternatively, the third bulk modulus of a third cladding 153 can be equal to or within 10% of the fourth bulk modulus of the fourth cladding 154.

The leading-edge sheath 156 or the root cladding 158 can include one or more of a metallic material, thermoplastic material, or composite material and have a fifth bulk modulus. The sheath bulk modulus or a root bulk modulus equal to or within 20% of the value of the first bulk modulus, the second bulk modulus, the third bulk modulus, or the fourth bulk modulus.

Alternatively, in different and non-limiting example, the sheath bulk modulus or a root bulk modulus can be greater than 20% of the value of the first bulk modulus, the second bulk modulus, the third bulk modulus, or the fourth bulk modulus.

While illustrated, by example, as having five different claddings, the cladding 120 can include any number of claddings located adjacent the tip 130, adjacent the trailing edge 126, adjacent the dovetail portion 138, or at the leading edge 124 of the composite airfoil 118.

It is further contemplated that while shown as a single piece, the first cladding 150, the second cladding 152, the third cladding 153, the leading edge sheath 156, the root cladding 158, or the fourth cladding 154 can be the combination of multiple pieces of cladding.

FIG. 5 shows a schematic cross-sectional view of the composite airfoil assembly 110 of FIG. 3, taken along section V-V, illustrating an interior 200 of the composite airfoil assembly 110 and portions of the cladding 120. The composite airfoil 118 includes a core illustrated as a woven core 202 and a skin illustrated as a laminate skin 204 provided over the woven core 202. The woven core 202 includes a composite structure having a core bulk modulus. The core bulk modulus is less than the first bulk modulus of the first cladding 150 and the second bulk modulus of the second cladding 152. It is also contemplated that the core bulk modulus is less than the third bulk modulus of the third cladding 153 and the fourth bulk modulus of the fourth cladding 154. It is further contemplated that the core bulk modulus can be less than sheath bulk modulus or the root bulk modulus.

The woven core 202 can be dry, with no additional materials, or alternatively, be impregnated with a resin and cured in one non-limiting example. The woven core 202 can made of a woven structure. Such a woven structure can be a three-dimensional woven structure. More specifically, the woven structure can be woven in a combination of the axial direction Ad, the radial direction Rd, and the circumferential direction Cd (FIG. 3), while it should be appreciated that the weave pattern can be formed and defined separate from the unducted turbine engine 10 (FIG. 1), such that the weave pattern is woven in any three, mutually-orthogonal planes in order to define a three-dimensional object relative to said planes. In one non-limiting example, the woven structure can include a three-dimensional weaving including a plurality of warp fibers 206 and a plurality of weft fibers 208 which can be woven in three directions to form a three-dimensional weave pattern structure for the woven core 202. The three directions for the plurality of warp fibers 206 and the plurality of weft fibers 208 can be defined along or angled relative to the axial direction Ad, the radial direction Rd, and the circumferential direction Cd (FIG. 3). In one non-limiting example, a Jacquard loom, or 3D weaving machine can be used to create complex three-dimensional woven patterns or structures, which can include interweaving one or more composites to form the woven core 202. The woven core 202 can be comprised of composite materials, such as carbon or carbon fibers, glass or glass fibers, nylon, rayon, or aramid fibers, while other materials such as nickel, titanium, or ceramic composites are contemplated in non-limiting examples.

It is further contemplated that the woven core 202 can be formed as a three-dimensional woven structure, having a braided or a plaited geometry or pattern. A braided or a plaited geometry or pattern can include a weave pattern that includes three or more interlaced fibers that are woven in a repeating pattern, for example. In another non-limiting example, the braided geometry can include a set of fibers or strands that are sequentially laid over one another to define the braided geometry. The woven or braided geometry or pattern can repeat for the entirety of the woven core 202, or only a portion thereof. Such additional braided geometries can be similar, where the arrangement of the fibers is the same, but the orientation is different, or where the arrangement of the fibers is different, and the orientation can be similar or dissimilar. The braided geometry or pattern can be formed with a Jacquard loom or 3D weaving machine with composite materials. A three-dimensional braided structure can include a braided pattern that extends in three dimensions, such as a combination of the axial direction Ad, the radial direction Rd, and the circumferential direction Cd.

The laminate skin 204 can be formed as a set of laminate layers, provided around or about the woven core 202. The laminate skin 204 can be pre-impregnated, fiber placed, or dry fiber laminate layers, in non-limiting examples. Such laminate layers forming the laminate skin 204 can be formed by resin transfer molding (RTM), partial RTM, same qualified resin transfer molding (SQRTM), or out-of-autoclave in non-limiting examples. The laminate skin 204 can include a skin bulk modulus. The skin bulk modulus can be different than the core bulk modulus. In one example, the skin bulk modulus can be greater than the core bulk modulus.

The laminate skin 204 can include a skin interior surface 210 and the skin outer surface 142 that defines at least a portion of the outer surface of the composite airfoil 118. The skin interior surface 210 can, at least in part, be in contact with at least a portion of a core exterior 212 of the woven core 202. In other words, the laminate skin 204 can be applied to at least a portion of the core exterior 212 of the woven core 202.

An axial airfoil length 214 can be measured between the leading edge 124 and the trailing edge 126 of the composite airfoil 118.

The first cladding 150 is coupled to the outer surface or the skin outer surface 142 of the composite airfoil 118 such that a first cladding interior surface 162 confronts the skin outer surface 142 of the composite airfoil 118. A first cladding thickness 216 extending from the first cladding interior surface 162 to the first cladding exterior surface 160 of the first cladding 150, can be in a range from 0.0001% to 10% of the axial airfoil length 214. More specifically, the first cladding thickness 216 can be in a range from 0.001% to 2% of the axial airfoil length 214.

Similar to the first cladding 150, the second cladding 152 has a second cladding thickness 222, extending from the second cladding exterior surface 166 to the second cladding interior surface 168. The second cladding thickness 222 can be in a range from 0.0001% to 10% of the axial airfoil length 214. More specifically, the second cladding thickness 222 can be in a range from 0.001% to 2% of the axial airfoil length 214. It is further contemplated that the second cladding thickness 222 can be in a range from 0.07% to 0.25% of the axial airfoil length 214. While illustrated as generally uniform, it is contemplated that the second cladding thickness 222 can vary, for example, in the axial or radial direction.

A coating 230 can be applied directly onto the laminate skin 204. However, it is contemplated that an intermediate adhesive layer is provided between the laminate skin 204 and the coating 230. While illustrated as covering a portion of the laminate skin 204, the coating 230 can cover the entirety of the laminate skin 204. It is further contemplated that the coating 230 can be provided on the laminate skin 204 where portions of the laminate skin 204 are uncovered by the cladding 120. It is yet further contemplated that the coating 230 can be applied to one or more portions of the cladding 120. The coating 230 can include a coating bulk modulus that is different or the same as one or more of the core bulk modulus or the skin bulk modulus. It is contemplated that the coating bulk modulus is less than the first bulk modulus, the second bulk modulus, the third bulk modulus, or fourth bulk modulus.

Additionally, the coating 230 can be an environmental barrier coating, for example, which can be used to resist oxidization or corrosion. In another example, the coating 230 can be a thermal barrier coating, at least partially thermally insulating the woven core 202 and laminate skin 204. Additional non-limiting examples of coatings can include an anti-ice coating such as polyurethane, ice-phobic materials, an ultraviolet radiation coating, or an oil barrier coating such as polyethylene or polypropylene. In one additional non-limiting example, the coating 230 can be formed as a polypropylene base layer and a polyurethane layer provided on the polypropylene base layer. It is further contemplated that an exterior paint layer (not shown) may be provided on the exterior of the coating 230, where such a paint layer may provide radiation protection, such as ultraviolet radiation.

Optionally, adhesive 232 can be applied to one or more portions of the skin outer surface 142. The adhesive 232 can be any number of layers of adhesive, including one. The adhesive 232 can include, but is not limited to, epoxy, phenolic, adhesive film, adhesive tape, cyanoacrylate, anaerobic adhesive, thermoplastic adhesive, polymeric resin, or other thermoset adhesive.

Alternatively, in different and non-limiting examples, the adhesive 232 can be applied to the cladding 120. More specifically, the adhesive 232 can be applied to the first cladding interior surface 162 and the second cladding interior surface 168. It is contemplated that the adhesive 232 can be applied to the cladding 120 or to both the cladding 120 and the skin outer surface 142.

It is further contemplated that one or more layers or types of adhesives can be located between the coating 230 or the skin 204 and the leading-edge sheath 156, the third cladding 153 (FIG. 4), the fourth cladding 154 (FIG. 4), the root cladding 158 (FIG. 4), or any combination therein.

Figure 6:
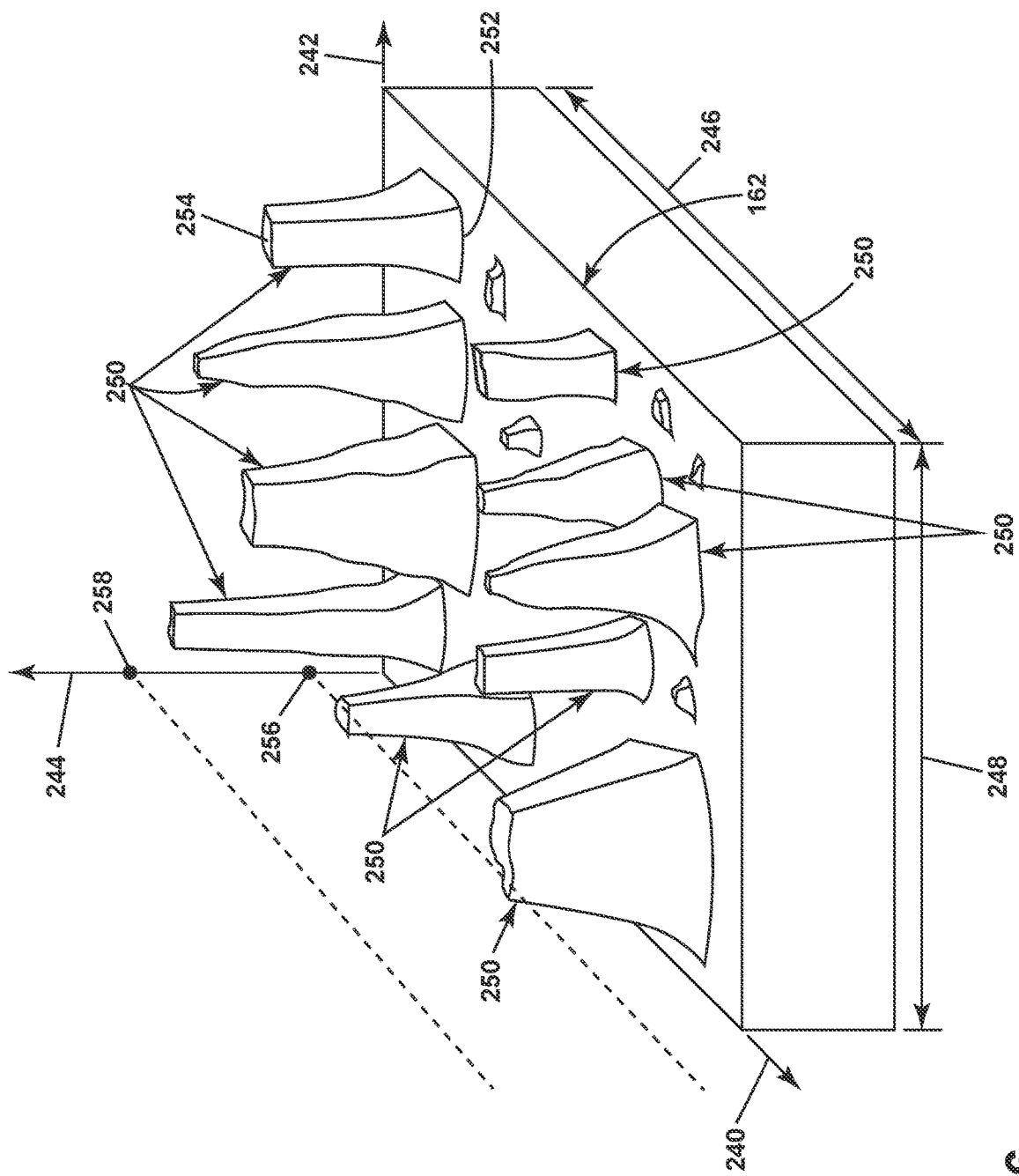
FIG. 6 is a schematic illustration of a portion of an interior surface of the cladding of FIG. 4 or FIG. 5, in accordance with an exemplary embodiment of the present disclosure.

FIG. 6 illustrates a schematic portion of the first interior surface 162. For the sake of reference, a three-dimensional coordinate system can be applied to the portion of the first interior surface 162. The three-dimensional coordinate system can include a direction indicative of a length 240, width 242, and height 244, where the length 240 is perpendicular to the width 242 and the height 244 is perpendicular to the length 240 and the width 242.

By way of non-limiting example, the portion of the first interior surface 162 is illustrated as having a sample length 246 and a sample width 248 of 645 millimeters (approximately 1 inch). That is, the portion of the first interior surface 162 can be 645 millimeters by 645 millimeters or approximately 1 square inch.

The preparation of the first interior surface 162 can result in a topography having random peaks 250. It is contemplated that the portion of the first interior surface 162, having been prepared, includes at least ten random peaks 250 per 645 square millimeters (approximately 1 square inch). The term, "random peaks" as used herein is defined as protrusions having a height measured from a base point 252 or reference plane to a furthest extent 254 that is farthest from the base point 252 or reference plane along the height 244 axis, where the height is greater than a predetermined minimum 256 illustrated as 0.007 millimeters (approximately 0.0003 inches). More specifically protrusions are considered random peaks if they appear randomly and have a height in a range from 0.007 millimeters to a predetermined maximum 258 illustrated as 0.025 millimeters (approximately 0.0003 inches and 0.0010 inches).

While the portion of the first interior surface 162 is illustrated, by way of example, as having ten random peaks 250, more random peaks are contemplated. While the random peaks 250 are illustrated as generally shaped as irregular truncated cones, any shape is contemplated that protrudes from a reference plane or base point. As illustrated, the random peaks 250 can have varying or similar lengths, widths, or heights, where the height of all the random peaks 250 is greater than the predetermined minimum 256.

It is further contemplated that the height, maximum height, or greatest height of the random peaks 250 can be indicative of an amount of material removed during preparation. That is, preparation of the first interior surface 162 can form the random peaks 250. The portion of the first interior surface 162 is prepared to have an Ra value greater than 100.

While illustrated as a portion of the first interior surface 162, it is contemplated that the schematic portion can be from the second cladding interior surface 168, third cladding interior surface 170, fourth cladding interior surface 180, the root interior surface 196, or the sheath interior surface 186.

Further, aspects of the drawings are not scaled and elements may be exaggerated to ease description and explanation.

Figure 7:
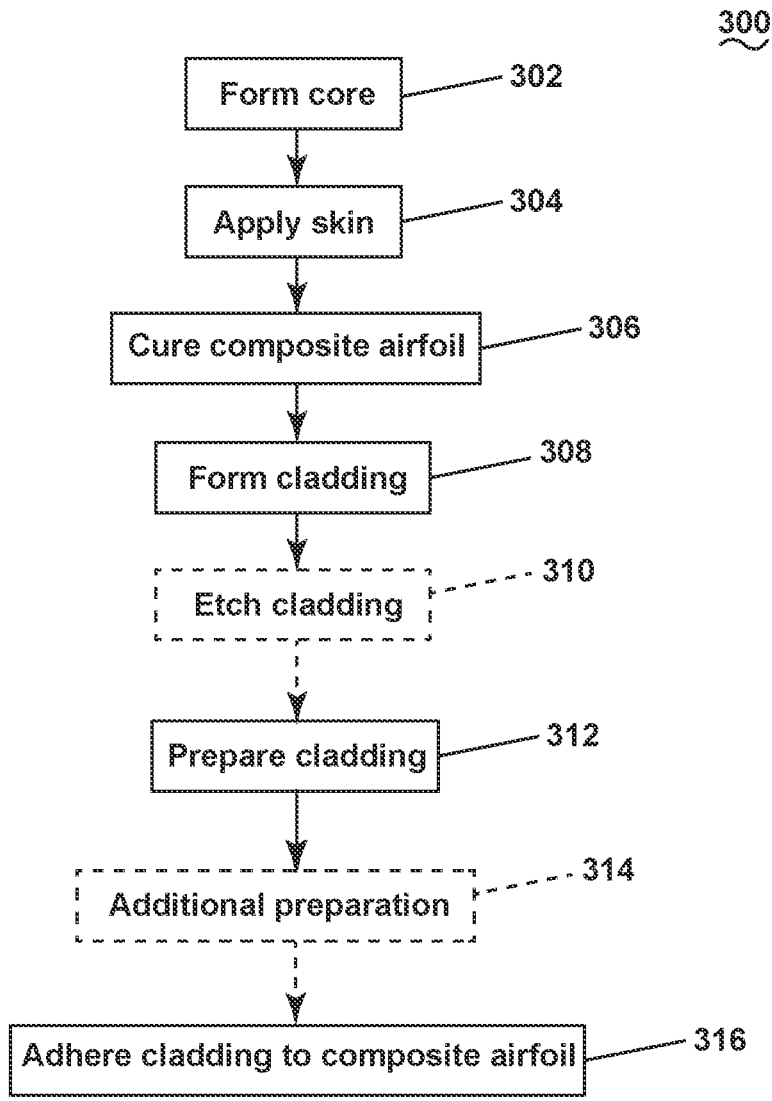
FIG. 7 is a flow chart illustrating a method of forming the composite airfoil assembly of FIG. 3, in accordance with an exemplary embodiment of the present disclosure.

FIG. 7 illustrates a method 300 of forming the composite airfoil assembly 110. With additional reference to FIGS. 4 and 5, at 302, the woven core 202 can be formed using composite materials. The woven core 202 can formed defining a specific woven structure. The specific woven structure can be a preform, specified to have a predetermined geometry, or can be cut or otherwise sized and shaped after manufacture of the woven structure, such as by cutting or grinding the woven core 202.

At 304, skin, illustrated as the laminate skin 204, is applied to at least a portion of the core exterior 212 of the woven core 202. Optionally, an adhesive material or other layer is provided between the woven core 202 and the laminate skin 204. The laminate skin 204 and the woven core 202 define the composite airfoil 118.

Optionally, it is contemplated that the coating 230 can be added before or after curing. That is, the coating 230 can be applied to one or more portions of the skin outer surface 142. It is contemplated that the coating 230 can be applied to portions of the skin outer surface 142 that doesn't receive the cladding 120. Alternatively, it is also contemplated, in another non-limiting example, that the coating 230 can be applied to one or more portions of the first coverage area 164, the second coverage area, the third coverage area 174, the sheath coverage area 187, or the root coverage area 198. It is further contemplated that any portion of the skin outer surface 142 or exterior surfaces of the cladding 120 can receive the coating 230.

The woven structure of the woven core 202 provides for greater adhesion to the laminate skin 204, as opposed to the adhesion between the laminate skin 204 and a non-woven core, and can provide for improved stiffness transition, elasticity transition, or bulk modulus transition between the woven core 202 and the coating 230, whereby the difference in stiffness, elasticity, or bulk modulus between adjacent materials is less than that compared to non-adjacent materials, or an airfoil having a non-woven core.

Optionally, additional composite layers, resins, adhesives, or other materials can be added to or applied to the composite airfoil 118 prior to curing. By way of non-limiting example, the woven core can be impregnated with a resin prior to curing.

At 306, the composite airfoil 118 is cured. The curing process depends on one or more of time, temperature, or pressure. Curing the composite airfoil 118 can include separate phases or steps of curing. It is contemplated that curing, additional curing, or partial curing of one or more portions of the composite airfoil assembly 110 can occur during or between any one or more steps of the method 300.

At 308, the cladding 120, illustrated as the first cladding 150, the second cladding 152, the third cladding 153, and optionally, the fourth cladding 154, is formed of a composite material, a thermoplastic material, a metallic material, or any combination thereof. It is contemplated that the metallic material included in the first cladding 150, the second cladding 152, the third cladding 153, or the fourth cladding

154 can be titanium, nickel, steel, tin, aluminum, brass, copper, or any combination thereof.

The forming of the cladding 120 can include additive manufacturing, machining, casting a metallic material to form the cladding 120, or any combination thereof.

Once formed, the cladding 120, illustrated by way of example as the first cladding 150, the second cladding 152, the third cladding 153, and optionally, the fourth cladding 154, has a cladding bulk modulus or a variety of cladding bulk moduli that are greater than the core bulk modulus.

Optionally, at 310, at least a portion of the cladding 120 can be etched. The etching at 310 can remove surface contaminates such as, but not limited to, alpha case or oxides.

By way of non-limiting example, the etching can be a chemical etch where an etching solvent is applied to at least a portion of the first cladding 150, the second cladding 152, the third cladding 153, and optionally, the fourth cladding 154. It is contemplated that the leading-edge sheath 156 or the root cladding 158 can also be etched. Additionally, or alternatively, portions of the first cladding 150, the second cladding 152, the third cladding 153, or the fourth cladding 154 can be submerged in a chemical bath. The chemical used to etch the cladding 120 can include hydrofluoric acid. Additionally, or alternatingly, the etching can include a mechanical removal of material at the surface.

At 312, at least a portion of the cladding 120 is prepared. That is, the at least a portion of the cladding 120 is roughened to have an Ra of at least 100. It is contemplated that the at least a portion of the cladding 120 that is prepared is one or more portions of the first cladding interior surface 162, the second cladding interior surface 168, the third cladding interior surface 172, the fourth cladding interior surface 182, the sheath interior surface 186, the root interior surface 196, or any combination thereof.

The at least a portion of the cladding 120 that is prepared has an Ra of at least 100. It is further contemplated that the Ra of the one or more portions of the first cladding interior surface 162, the second cladding interior surface 168, the third cladding interior surface 172, the fourth cladding interior surface 182, the sheath interior surface 186, or the root interior surface 196 is in a range from 150 to 400. More specifically, the Ra of the one or more of the prepared surfaces of the first cladding interior surface 162, the second cladding interior surface 168, the third cladding interior surface 172, the fourth cladding interior surface 182, the sheath interior surface 186, or the root interior surface 196 is in a range from 150 to 300.

Preparing the at least a portion of the cladding 120 can include material removal of material from the one or more portions of the first cladding interior surface 162, the second cladding interior surface 168, the third cladding interior surface 172, the fourth cladding interior surface 182, the sheath interior surface 186, or the root interior surface 196.

The preparation of the interior surface of each cladding results in a topography of the first cladding interior surface 162, the second cladding interior surface 168, the third cladding interior surface 172, the fourth cladding interior surface 182, the sheath interior surface 186, or the root interior surface 196 having a minimum of ten random peaks 250 per 645 square millimeters (approximately 1 square inch). The random peaks, when measured from a base to a peak, can have a height in a range from 0.007 millimeters to 0.025 millimeters (approximately 0.0003 inches and 0.0010 inches).

The depth of material removed can be in a range from 0.007 millimeters to 0.130 millimeters (approximately 0.001 inches to 0.005 inches). More specifically, the depth of material removed can be in a range from 0.025 millimeters to 0.127 millimeters (approximately 0.001 inches to 0.005 inches). Additionally, or alternatively, the depth of material removed can be in a range from 0.001% to 10% of the first cladding thickness 216 or the second cladding thickness 222. Removing more than 10% can decrease the stiffness or strength of the cladding 120, while removing less than 0.001% would not provide the desired increase in bonding between the cladding 120 and the composite airfoil 118.

Optionally at 314, additional bond preparation can occur to one or more portions of the cladding 120. The additional bond preparation can include one or more of an additional etch cycle, application of a conversion coating, or application of a primer to the one or more portions of the cladding 120.

By way of non-limiting example, the additional etch cycle can include, but is not limited to, a chemical etch. The conversion coating can include, by way of non-limiting example, a water-based solution gelation (sol-gel). It is contemplated that one or more coats of the same or different types of conversion coatings can be applied to one or more portions of the cladding 120.

The primer can promote adhesion between a metallic material and other materials. By way of non-limiting example, the primer can be an epoxy. It is contemplated that the primer can include, by way of example, strontium, chromium, or zinc.

It is contemplated that one or more of the additional etch cycle, the application of the conversion coating, or the application of the primer can further enhance bonding or adhesion of the one or more portions of the cladding 120.

At 316, after preparing of the interior surface of each cladding, the at least a portion of the cladding 120 is adhered, applied, or otherwise coupled to the skin outer surface 142 of the composite airfoil 118. That is, the first cladding 150, the second cladding 152, the third cladding 153, the fourth cladding 154, the leading-edge sheath 156, the root cladding 158, or any combination thereof can be adhered to the pressure side 132 or the suction side 134 at the trailing edge 126, the leading edge 124, the tip 130, or the root 128 of the composite airfoil 118. More specifically, the one or more portions of the first cladding interior surface 162, the second cladding interior surface 168, the third cladding interior surface 172, the fourth cladding interior surface 182, the sheath interior surface 186, or the root interior surface 196 confront the skin outer surface 142.

The adhering the cladding 120 can include applying the adhesive 232 to the cladding interior surface, illustrated as the first cladding interior surface 162, the second cladding interior surface 168, the third cladding interior surface 172, the fourth cladding interior surface 182, the sheath interior surface 186, or the root interior surface 196, the skin outer surface 142, or the cladding interior surface and the skin outer surface.

By way of non-limiting example, the adhering can include adhering the first cladding 150 on the pressure side 132 at or adjacent the trailing edge 126 and the second cladding 152 on the suction side 134 at or adjacent the trailing edge 126.

By way of further non-limiting example, the adhering can include adhering the third cladding 153 on the pressure side 132 at or adjacent the tip 130 and the fourth cladding 154 on the suction side 134 at or adjacent the tip 130.

If the coating 230 is applied after the curing, it can be added before or after the first cladding 150, the second cladding 152, the third cladding 153, the fourth cladding 154, the leading-edge sheath 156, the root cladding 158 or any combination thereof. The coating 230 can be applied to portions of the skin outer surface 142 not covered by the cladding 120. Alternatively, in another different non-limiting example, the coating 230 can be applied to a portion of the cladding 120 or between the skin outer surface 142 and the cladding 120.

Benefits of aspects of the disclosure include using a woven core, laminate skin, and cladding that provide a weight. The cladding can be material bonded to the exterior of the laminate skin, where the laminate skin overlies the woven core. The cladding added at the tip or trailing edge can be a composite material, a thermoplastic material or metallic material, where the cladding provides improved stiffness to the airfoil to enhance robustness to deflection under extreme events such as an ingestion event.

Cladding, when applied using discrete portions, illustrated as the first cladding, the second cladding, and the third cladding, can be customized to the airfoil based on size, use, environment, or location within the turbine engine.

Preparing one or more surfaces of the cladding prior to adhering to the composite airfoil improves bond capability of cladding when applied to the composite airfoil.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A composite airfoil assembly for a gas turbine engine, the composite airfoil assembly comprising a core comprising a composite structure defining a core exterior, a skin having a skin interior surface coupled to at least a portion of the core exterior, and a skin outer surface, and a cladding having a cladding interior surface coupled to the skin outer surface, wherein at least a portion of the cladding interior surface has an arithmetic average roughness (Ra) of at least 100.

The composite airfoil assembly of any preceding clause, further comprising an adhesive bonding the cladding interior surface with a portion of the skin outer surface.

The composite airfoil assembly of any preceding clause, wherein the cladding is coupled to the skin outer surface adjacent at least one of a trailing edge, a leading edge, a root, or a tip of a composite airfoil defined by the core and the skin.

The composite airfoil assembly of any preceding clause, wherein the cladding includes a first cladding having a first interior surface and a second cladding having a second interior surface, where the Ra of the first interior surface is different than the Ra of the second interior surface.

The composite airfoil assembly of any preceding clause, wherein the cladding is coupled to the skin outer surface adjacent at least one of a trailing edge, a leading edge, a root, or a tip of a composite airfoil defined by the core and the skin.

The composite airfoil assembly of any preceding clause, wherein the arithmetic average roughness (Ra) of the cladding interior surface is in a range from 150 to 400.

The composite airfoil assembly of any preceding clause, wherein the cladding comprises a metallic material.

The composite airfoil assembly of any preceding clause, wherein the metallic material comprises titanium, nickel, nickel alloys, steel, tin, aluminum, brass, copper, or any combination thereof.

The composite airfoil assembly of any preceding clause, wherein the core is a woven core that includes a three-dimensional weave pattern.

The composite airfoil assembly of any preceding clause, wherein the skin is a laminate skin applied to the woven core.

A method of forming a composite airfoil assembly, the method comprising forming, using composite materials, a core, wherein the core comprises a woven structure, applying a skin to at least a portion of an exterior of the core to define a composite airfoil, the skin having a skin interior surface and a skin outer surface, curing the composite airfoil, forming a cladding having a cladding exterior surface and a cladding interior surface, preparing at least a portion of the cladding interior surface to have an arithmetic average roughness (Ra) of 100 or more, and adhering the cladding to a pressure side or a suction side at a trailing edge, a leading edge, or a tip of the composite airfoil, wherein the cladding interior surface confronts a portion of the skin outer surface.

The method of any preceding clause, wherein preparing the at least a portion of the cladding interior surface includes preparing the at least a portion of the cladding interior surface to have an arithmetic average roughness (Ra) in a range of 150 to 400.

The method of any preceding clause, wherein the at least a portion of the cladding interior surface includes a depth of material removal in a range from 0.025 millimeters to 0.127 millimeters.

The method of any preceding clause, further comprising, prior to preparing the at least a portion of the cladding interior surface, etching the at least a portion of the cladding.

The method of any preceding clause, wherein preparing the at least a portion of the cladding interior surface, includes preparing the at least a portion of the cladding interior surface to have an arithmetic average roughness (Ra) in a range of 150 to 400.

The method of any preceding clause, further comprising applying a primer to one or more surfaces of the cladding prior to applying the cladding or after adhering the cladding.

The method of any preceding clause, wherein adhering the cladding includes applying an adhesive to the cladding interior surface, the skin outer surface, or the cladding interior surface and the skin outer surface.

The method of any preceding clause, wherein forming the cladding includes additively manufacturing, machining, or casting a metallic material to form the cladding.

The method of any preceding clause, wherein preparing the at least a portion of the cladding interior surface results in a topography of the first cladding interior surface, the second cladding interior surface, the third cladding interior surface, the fourth cladding interior surface, the sheath interior surface, or the root interior surface having a minimum of ten random peaks 250 per 645 square millimeters (approximately 1 square inch).

The method of any preceding clause, wherein forming the cladding comprises forming a first cladding and a second cladding, and adhering the cladding comprises adhering the first cladding on the pressure side at the trailing edge and the second cladding on the suction side at the trailing edge.

The method of any preceding clause, wherein applying the skin to the exterior of the core comprises applying a laminate skin.

The composite airfoil assembly of any preceding clause, wherein the cladding has a cladding bulk moduli greater than a core bulk modulus of the core.

The composite airfoil assembly of any preceding clause, wherein the cladding comprises titanium, nickel, steel, tin, aluminum, brass, copper, or any combination thereof.

The composite airfoil assembly of any preceding clause, wherein the cladding includes a first cladding and a second cladding located at the trailing edge of the composite airfoil, wherein the first cladding and the second cladding are located on opposite sides of the composite airfoil.

The composite airfoil assembly of any preceding clause, further comprising a third cladding located at the tip of the composite airfoil.

The composite airfoil assembly of any preceding clause, wherein the cladding comprising a leading edge sheath located at the leading edge of the composite airfoil.

The composite airfoil assembly of any preceding clause, wherein the leading edge sheath comprises one or more of a composite, thermoplastic, or metallic material.

The composite airfoil assembly of any preceding clause, wherein the core is a woven core that includes a three-dimensional weave pattern.

The composite airfoil assembly of any preceding clause, wherein the skin is a laminate skin.

The composite airfoil assembly of any preceding clause, wherein the three-dimensional weave pattern includes a braided pattern.

The method of any preceding clause, further comprising impregnating the woven core with a resin prior to curing.

What is claimed is:

1. A composite airfoil assembly for a gas turbine engine, the composite airfoil assembly comprising:
   a core comprising a composite structure defining a core exterior;
   a skin having a skin interior surface coupled to at least a portion of the core exterior, and a skin outer surface; and
   a cladding having a cladding interior surface coupled to the skin outer surface, wherein at least a portion of the cladding interior surface has an arithmetic average roughness (Ra) of at least 100, wherein the cladding includes a first cladding having a first interior surface and a second cladding having a second interior surface, where the arithmetic average roughness (Ra) of the first interior surface is different than the arithmetic average roughness (Ra) of the second interior surface.

2. The composite airfoil assembly of claim 1, further comprising an adhesive bonding the cladding interior surface with a portion of the skin outer surface.

3. The composite airfoil assembly of claim 2, wherein the cladding is coupled to the skin outer surface adjacent at least one of a trailing edge, a leading edge, a root, or a tip of a composite airfoil defined by the core and the skin.

4. The composite airfoil assembly of claim 1, wherein the cladding is coupled to the skin outer surface adjacent at least one of a trailing edge, a leading edge, a root, or a tip of a composite airfoil defined by the core and the skin.

5. The composite airfoil assembly of claim 1, wherein the arithmetic average roughness (Ra) of the cladding interior surface is in a range from 150 to 400.

6. The composite airfoil assembly of claim 1, wherein the cladding comprises a metallic material.

7. The composite airfoil assembly of claim 6, wherein the metallic material comprises titanium, nickel, nickel alloys, steel, tin, aluminum, brass, copper, or any combination thereof.

8. The composite airfoil assembly of claim 1, wherein the core is a woven core that includes a three-dimensional weave pattern.

9. The composite airfoil assembly of claim 8, wherein the skin is a laminate skin applied to the woven core.

10. The composite airfoil assembly of claim 1, wherein the first interior surface or the second interior surface includes a topography having a minimum of ten random peaks per 645 square millimeters (approximately 1 square inch).

11. A method of forming a composite airfoil assembly, the method comprising:
    forming, using composite materials, a core, wherein the core comprises a woven structure;
    applying a skin to at least a portion of an exterior of the core to define a composite airfoil, the skin having a skin interior surface and a skin outer surface;
    curing the composite airfoil;
    forming a cladding having a cladding exterior surface and a cladding interior surface;
    preparing at least a portion of the cladding interior surface to have an arithmetic average roughness (Ra) of 100 or more, wherein the preparing the at least a portion of the cladding interior surface results in a topography of a first cladding interior surface, a second cladding interior surface, a third cladding interior surface, a fourth cladding interior surface, a sheath interior surface, or a root interior surface having a minimum of ten random peaks per 645 square millimeters (approximately 1 square inch); and
    adhering the cladding to a pressure side or a suction side at a trailing edge, a leading edge, or a tip of the composite airfoil, wherein the cladding interior surface confronts a portion of the skin outer surface.

12. The method of claim 11, wherein preparing the at least a portion of the cladding interior surface includes preparing the at least a portion of the cladding interior surface to have an arithmetic average roughness (Ra) in a range of 150 to 400.

13. The method of claim 11, wherein the at least a portion of the cladding interior surface includes a depth of material removal in a range from 0.025 millimeters to 0.127 millimeters.

14. The method of claim 11, further comprising, prior to the preparing the at least a portion of the cladding interior surface, etching the at least a portion of the cladding.

15. The method of claim 14, wherein preparing the at least a portion of the cladding interior surface, includes preparing the at least a portion of the cladding interior surface to have an arithmetic average roughness (Ra) in a range of 150 to 400.

16. The method of claim 11, further comprising applying a primer to one or more surfaces of the cladding prior to applying the cladding or after adhering the cladding.

17. The method of claim 11, wherein adhering the cladding includes applying an adhesive to the cladding interior surface, the skin outer surface, or the cladding interior surface and the skin outer surface.

18. The method of claim 11, wherein forming the cladding includes additively manufacturing, machining, or casting a metallic material to form the cladding.

19. The method of claim 11, wherein forming the cladding comprises forming a first cladding and a second cladding, and adhering the cladding comprises adhering the first cladding on the pressure side at the trailing edge and the second cladding on the suction side at the trailing edge.

20. A composite airfoil assembly for a gas turbine engine, the composite airfoil assembly comprising:
- a core comprising a composite structure defining a core exterior;
- a skin having a skin interior surface coupled to at least a portion of the core exterior, and a skin outer surface; and
- a cladding having a cladding interior surface coupled to the skin outer surface, wherein at least a portion of the cladding interior surface has an arithmetic average roughness (Ra) of at least 100, wherein at least a portion of the cladding interior surface results in a topography having a minimum of ten random peaks per 645 square millimeters (approximately 1 square inch).

* * * * *